United States Patent
Boday et al.

(10) Patent No.: US 9,809,680 B2
(45) Date of Patent: Nov. 7, 2017

(54) AMINE SCAVENGERS FOR SYNTHESIS OF POLYTHIOAMINALS

(71) Applicant: International Business Machines Corporation, Armonk, NY (US)

(72) Inventors: Dylan J. Boday, Tucson, AZ (US); Jeannette M. Garcia, San Leandro, CA (US); James L. Hedrick, Pleasanton, CA (US); Robert J. Ono, San Jose, CA (US); Rudy J. Wojtecki, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/157,224

(22) Filed: May 17, 2016

(65) Prior Publication Data
US 2017/0137572 A1    May 18, 2017

Related U.S. Application Data

(62) Division of application No. 14/940,063, filed on Nov. 12, 2015, now abandoned.

(51) Int. Cl.
C08G 75/02    (2016.01)

(52) U.S. Cl.
CPC .................................. *C08G 75/02* (2013.01)

(58) Field of Classification Search
CPC .................................................. C08G 75/02
See application file for complete search history.

(56) References Cited

U.S. PATENT DOCUMENTS

| | | | |
|---|---|---|---|
| 4,211,847 A | 7/1980 | Kehr et al. | |
| 4,439,553 A | 3/1984 | Guthrie et al. | |
| 4,980,385 A | 12/1990 | Scarpati et al. | |
| 5,543,515 A * | 8/1996 | Koehler | C07D 295/24 540/604 |
| 6,489,272 B2 | 12/2002 | Gatlin | |
| 8,058,493 B2 | 11/2011 | Stark et al. | |
| 8,357,290 B2 | 1/2013 | Stark et al. | |
| 9,120,897 B1 * | 9/2015 | Boday | C08G 75/04 |
| 9,534,084 B1 * | 1/2017 | Boday | C08G 75/04 |

FOREIGN PATENT DOCUMENTS

| | | | |
|---|---|---|---|
| DE | EP 0413259 A2 * | 2/1991 | C07C 209/84 |
| JP | 11-226396 | 8/1999 | |
| WO | 2005/066121 A2 | 7/2005 | |

OTHER PUBLICATIONS

EP0413259A2, Feb. 1991, pp. 1-5; English translation.*
Hodges, J. C. "Covalent Scavengers for Primary and Secondary Amines" Synlett 1999, No. 1, pp. 152-158.*
Takikawa et al., "Synthesis and Oxidative Ring Contraction of 1,5,3,7-Dichalcogena-diazocanes. Noel Formation of 1,2,4-Diselenazocanes," 2006, Bull. Chem. Soc. Jpn, vol. 79, No. 12, pp. 1913-1925.
Wojtecki, R. J. et al. J. Am. Chem. Soc. 2015, 137, pp. 14248-14251; Published Oct. 27, 2015.
Woktecki et al., "Developments in Dynamic Covalent Chemistries from the Reaction of Thiols with Hexahydrotriazines," Journal of the American Chemical Society, 2015, 4 pages.

\* cited by examiner

*Primary Examiner* — Medhanit Bahta
(74) *Attorney, Agent, or Firm* — Patterson + Sheridan, LLP

(57) ABSTRACT

Thioaminal polymers are made from hexahydrotriazine precursors and dithiol precursors. The precursors are blended together and subjected to mild heating to make the polymers. An amine scavenger is used to remove amine byproducts from the reaction, thus promoting polymer growth to high molecular weight. The polymers have the general structure

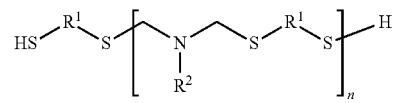

wherein each $R^1$ is independently an organic or heteroorganic group, a plurality of $R^2$ groups are substituents having molecular weight greater than about 120 Daltons, and n is an integer greater than or equal to 1. The polymers may be functionalized by adding a thiol-reactive group to either end or both ends.

23 Claims, No Drawings

AMINE SCAVENGERS FOR SYNTHESIS OF POLYTHIOAMINALS

CROSS-REFERENCE TO RELATED APPLICATIONS

This application is a divisional of co-pending U.S. patent application Ser. No. 14/940,063, filed Nov. 12, 2015. The aforementioned related patent application is herein incorporated by reference in its entirety.

FIELD

The present invention relates to methods of making thioaminal polymers.

BACKGROUND

By one measure, delivery of therapeutic medicaments generated $122.3 billion in 2012 and will grow to $198.4 billion by 2017. Growth in the market for drug delivery technology provides participants with opportunities to create new ways to deliver increasingly potent and specific therapeutics. Polyethylene glycol (PEG) remains the only synthetic polymer used in commercial products as a stealth drug delivery vehicle because it is substantially biocompatible, and it prolongs blood circulation times for therapeutic carriers. PEG is also associated with hazardous side-effects including immunological responses that can lead to increased blood clotting and embolism, nonspecific recognition by the immune system, and hypersensitivity reactions. These side-effects may be intensified by the non-biodegradability of PEG. Therefore, there is a need in the drug delivery industry for a versatile delivery vehicle for therapeutics that has fewer side-effects.

Polythioaminals are promising substitutes for PEG as therapeutic deliver vehicles. Polythioaminals are polymers that have the general structure

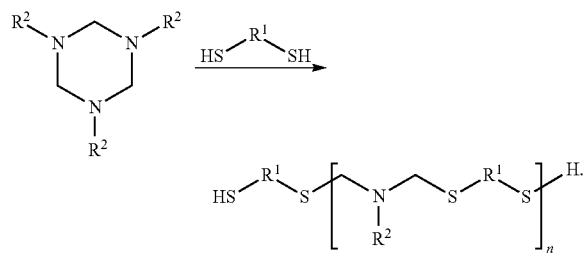

where $R^1$ and $R^2$ are organic or hetero-organic species. It has been shown that polythioaminals having the above structure may be made by reacting an N-substituted hexahydrotriazine with a dithiol, as follows:

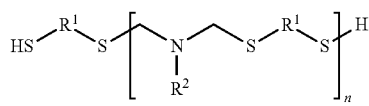

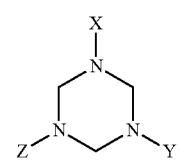

Subsequent reactions may replace the hydrogen atoms at the end of the thioaminal polymer with thiol-reactive groups.

The reaction above generates a byproduct amine $R^2$—NH2. As the reaction proceeds, concentration of the byproduct amine grows to an extent that limits progress of the reaction to high degrees of polymerization. If the byproduct amine is not removed, molecular weight of the polymer generally does not grow above about 2,000 Daltons. If the reaction is performed at elevated temperature, volatile byproduct amines may be vaporized to drive the reaction to higher molecular weight. Thioaminal polymers tend to decompose, however, at temperatures much above about 200° C., so use of such methods to increase molecular weight is limited.

Broadly applicable methods of increasing molecular weight of thioaminal polymers are needed.

SUMMARY

Described herein is a thioaminal polymer, comprising a plurality of thioaminal linkages having the general structure

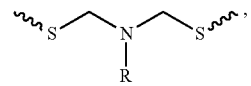

wherein a plurality, for example about 50% or more, of the R groups have a molecular weight greater than about 120 Daltons.

Also described herein is a method of forming a composition, comprising forming a reaction mixture comprising a hexahydrotriazine, a dithiol, and an amine scavenger having a selective reactivity to amines in the reaction mixture; and forming a thioaminal polymer by heating the reaction mixture to a temperature of at least about 50° C.

Also described herein is a thioaminal polymer made by a process, comprising forming a reaction mixture comprising a hexahydrotriazine, a dithiol, and an amine scavenger having a selective reactivity to amines in the reaction mixture, wherein the hexahydrotriazine comprises a plurality of molecules having the general structure wherein X, Y, and Z are each chemical substituents covalently bonded to nitrogen atoms of the hexahydrotriazine, and at least one of X, Y, and Z, in each molecule of the plurality of molecules has a molecular weight of at least about 120 Daltons; and heating the reaction mixture to a temperature of at least about 50° C. to form a thioaminal polymer.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Similarly, the terms "further comprises," "may further comprise," and "further comprising," when used in this specification, specify the presence of additional features or components, without precluding the presence or addition of other features or components. The terms "further comprises," "may further comprise", and "further comprising" in this specification do not mean that any features or components are excluded from any embodiments. When a range is used to express a possible value using two numerical limits a and b (e.g., a concentration of a ppm to b ppm), unless otherwise stated the value can be a, b, or any number between a and b.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

The inventors have discovered that thioaminal polymers may be made with high molecular weight by using amine scavengers to remove amine byproducts from the reaction mixture. The reaction system thus provides a thioaminal polymer having a plurality of thioaminal linkages with the general structure

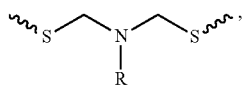

wherein a plurality, for example about 50% or more, of the R groups have a molecular weight greater than about 120 Daltons. A hexahydrotriazine precursor is reacted with a diamine precursor in the presence of an amine scavenger that selectively reacts with amines in the reaction system to form a thioaminal polymer. The reaction system thus proceeds according to the following scheme:

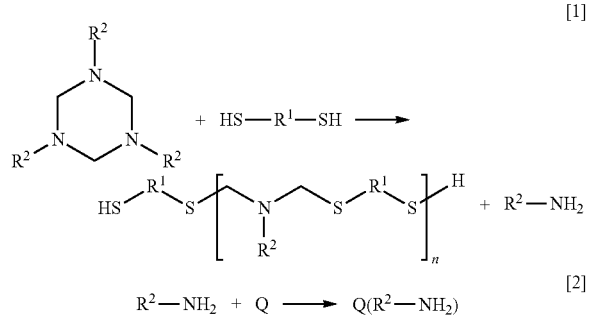

where Q is a species that reacts selectively with the amines $R^2$—$NH_2$ in the reaction mixture to form a species $Q(R^2$—$NH_2)$ that does not influence the progress of reaction [1]. Species Q is an amine scavenger species and species $Q(R^2$—$NH_2)$ is a spectator species with respect to reaction [1]. In this way, the amine byproduct $R^2$—$NH_2$ is removed from the reaction system, enabling reaction [1] to proceed to high degrees of polymerization. The spectator species $Q(R^2$—$NH_2)$ may decompose in some instances to yield $QR^2$ and $NH_3$, and the ammonia may volatilize out of the reaction mixture. Thus, in some instances, the spectator species $Q(R^2$—$NH_2)$ may be a transition species, or an unstable species, leading to a second spectator species $QR^2$ that is more stable. At least some of the spectator species $Q(R^2$—$NH_2)$ and $QR^2$ are sufficiently non-volatile to remain in the reaction mixture at polymerization conditions.

In the reaction [1], each instance of $R^2$ is independently an organic or hetero-organic group such that the hexahydrotriazine precursor has the general structure

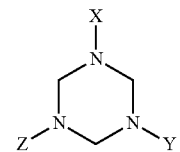

wherein X, Y, and Z are $R^2$ groups that are each chemical substituents covalently bonded to nitrogen atoms of the hexahydrotriazine. Use of the amine scavenger enables operation of reaction [1] even when one or more of the chemical substituents X, Y, and Z have molecular weight above about 120 Daltons by removing the amine byproducts, even the non-volatile amine byproducts, stemming from use of the above hexahydrotriazine precursor. In reaction [1], $R^1$ is, in each instance, an organic or hetero-organic group. In each instance, $R^1$ may be a hydrocarbon species; an aromatic and/or aliphatic species; or a polymer species such as polyethylene glycol, a polyol species, or polyether species, any of which may have non-hydrogen substituents, as governed by the dithiols used in the reaction scheme. In one embodiment, at least one instance of $R^1$ is polyethylene glycol.

Alkane dithiols such as butane dithiol, pentane dithiol, and hexane dithiol may be used as precursors. Aromatic dithiols such as benzene dithiol, toluene dithiol, and xylene dithiol may also be used as precursors. The dithiol may be a polymer species, such as a dithiol-capped polyolefin. Dithio-polyol species may also be used, such as dithio-alkane diols, triols, and the like. Each instance of $R^2$ may independently be hydrogen, fluorine, methyl, or an alkyl group such as ethyl, propyl, butyl, hexyl, or cyclohexyl.

The amine scavenger may be a compound or a mixture of compounds that react selectively with amines in the reaction mixture. The amine scavenger may also be a compound or mixture of compounds that trap liberated amines as they are formed in reaction [1] above. The most effective amine scavengers will also be chemically orthogonal to all other species in the reaction mixture. So the most effective amine scavenger will have negligible reactivity with thiols, dithiols, hexahydrotriazines, paraformaldehyde, and thioaminal polymers.

Molecules with acyl carbon atoms are generally reactive with amines. Molecules with acyl carbon atoms but no strongly acidic hydrogen atoms are good amine scavengers for embodiments described herein. Examples of effective amine scavengers include anhydrides and carbonates. Cyclic carbonates, such as propylene carbonate, trimethylene carbonate, and glycerin carbonate may be used. Cyclic anhydrides, such as succinic anhydride, and derivatives thereof, are classes of compounds that can be effective amine scavengers. Linear carbonates, such as alkyl carbonates, for example dipropyl carbonate, may also be used. Other categories of selective amine scavengers include isocyanates, thiocyanates, carbonyl imidazoles such as carbonyl diimidazole, organic oxalates, lactides, succinimides, and thioanhydrides.

The amine scavengers may be supported or solvated. Supported amine scavengers may be used to sequester amines from the reaction mixture. In a supported embodiment, amines react with amine scavengers on the surface of the support and remove the amines from the reaction mixture. Supported amine scavengers may be stationary or fluidized, and may be monolithic or particulate. With supported amine scavengers, the support, with the removed amine, may be removed from the reaction mixture by filtering the mixture. As the support material is removed from the mixture, amines bound to the support material by the supported amine scavengers are also removed. Amine scavengers may be attached to polymers such as polyethylene glycol, or amine scavenging polymers such as polyesters may be constructed from amine scavenging monomers.

In one example, a polythioaminal composition was made by mixing 1 mL of 1,3,5-trimethylhexahydrotriazine (7.11 mmol) with 1.285 mL of 1,6-hexanedithiol (1.069 g, 1 molar equivalent) in a reaction vessel. To the mixture was added 1.2 mL of propylene carbonate. The resulting mixture was heated to 85° C. under continuous nitrogen flow. After 4 hours of stirring, an additional 0.2 mL of propylene carbonate was added to the reaction. After 72 total hours of stirring, molecular weight growth of the polymer appeared to stop. Final molecular weight of the resulting polymer was found to be $M_n$ of 1,432 and $M_w$ of 2,062. In an example performing the same reaction using succinic anhydride rather than propylene carbonate, final $M_w$ was 1,100, and in a comparative example using no amine scavenger, final $M_w$ was 900.

The thioaminal polymers described herein may be end-functionalized by adding a thiol-reactive material to the thioaminal polymer. The thioaminal polymer may be isolated from the reaction mixture and then dissolved in a polar aprotic solvent, such as N-methyl pyrrolidone prior to adding the thiol-reactive material. The thiol-reactive material may react with the thioaminal polymer according to the following scheme:

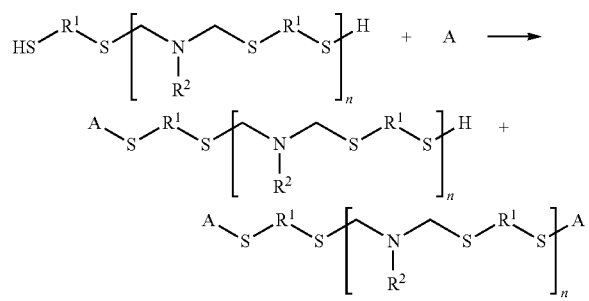

where "A" is any thiol-reactive species. Of particular use, "A" may be a theranostic agent. "A" may be a species selected from the group consisting of hydrogen, an alkane thiol, an aromatic thiol such as a thiophenol or a thioaniline, a peptide, a protein, a thio-acid, a nucleotide, and combinations thereof. Two "A" groups may be added to a thioaminal polymer molecule to functionalize both ends of the molecule with the same, or different, groups. Such functionalization may be performed sequentially, as follows:

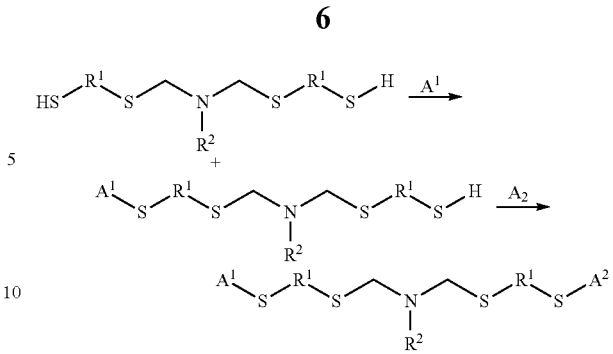

where "$A^1$" and "$A^2$" are both thiol-reactive species, any of which may be a theranostic agent. "$A^1$" and "$A^2$" may be reactive or non-reactive species, cargoes, linking groups, medicines, functional species for further modification after construction of the thioaminal polymer, polymerization starters, chemical species capable of initiating depolymerization, or a combination thereof. Any of the above species may be linking species or groups, or non-linking species or groups.

When "A" is a linking group, the following structure may result:

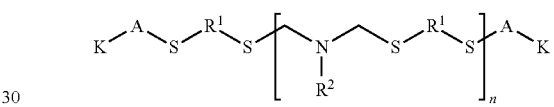

where "K" is any species bondable to "A", and $R^1$, $R^2$, and n are defined as above. In the case where two different A groups are used (for example A and Z), K may be a species that reacts with one, but not the other, "A" group such that only one of the "A" groups is a linking group. "K" may be another polythioaminal segment that links to "A" via thiol reactivity, as "A" is linked to the thioaminal polymer of reaction (1), or "K" may be any other desired species, for example another polymer, peptide, reactive or non-reactive species, cargo, linking group, functional species, polymerization starter, or depolymerization starter that links to "A" via any suitable linkage. "K" may also be a species selected from the group consisting of hydrogen, an alkane thiol, an aromatic thiol such as a thiophenol or a thioaniline, a peptide, a protein, a thio-acid, a nucleotide, and combinations thereof.

"A" may come from a solid, a liquid, or a gas. In reaction (1) above, the reaction with HS—$R^1$—SH may be performed in a bulk liquid phase or at a phase interface between the bulk liquid and a gas phase, an immiscible liquid phase, or a solid phase.

It should be noted that a mixture of dithiol precursors may be used, if desired, in reaction scheme (1). A plurality of dithiol precursors may be used to make a copolymer or terpolymer, or any degree of mixed polymer. The mixed polymer may be a block mixed polymer, such as a block copolymer having the general formula:

(2)

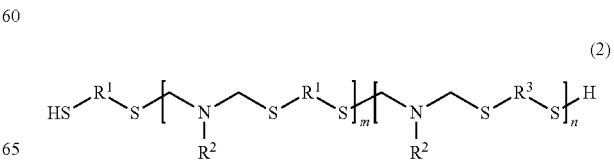

where each instance of $R^3$ is independently an organic or hetero-organic group different from $R^1$, and each instance of $R^3$ may be the same species. A single amine scavenger selective to $R^2$ may be used to promote formation of the polymer (B) using a mixture of dithiols.

Each instance of $R^1$ in structure (2) is independently an organic or hetero-organic group, each instance of $R^1$ may be the same species, each instance of $R^2$ is independently an organic or hetero-organic group, at least some of which have a molecular weight greater than about 120 Daltons, each instance of $R^2$ may be the same species, and m and n are each integers greater than or equal to 1. The polymer of structure (2) may also be reacted with a thiol-reactive precursor containing one or more species "A" to attach "A" groups to the structure (2) above. The result would be a polymer having the general formula:

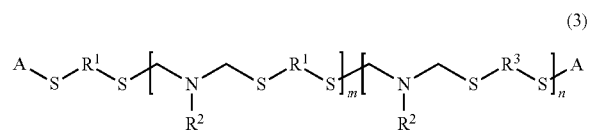

(3)

with $R^1$, $R^2$, $R^3$, m, n, and A defined as described above. To make a block copolymer such as the structure (2) or the structure (3), a first segment is made by reacting an N-substituted hexahydrotriazine having the general formula

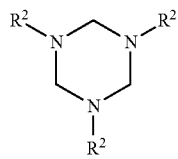

with a first dithiol precursor $HSR^1SH$, optionally using a solvent, either to extinction of the first dithiol precursor or to a desired stopping point. If a portion of the first dithiol precursor remains after reaching the stopping point, the remainder of the first dithiol precursor may be removed, or the first segment may be removed from the reaction mixture. An amine scavenger may be used to promote growth of molecular weight, as described above. A second segment is made by reacting the N-substituted hexahydrotriazine with a second dithiol precursor $HSR^3SH$ by a similar procedure, with $R^1$, $R^2$, and $R^3$ defined as above, with amine scavenger used to increase molecular weight. The first and second segments are then mixed together with the N-substituted hexahydrotriazine precursor to encourage formation of a block copolymer. A solvent may be used to control viscosity of the polymerization mixture, if desired. A random copolymer may be made by mixing together the first and second dithiol precursors, optionally with a solvent, and adding the N-substituted hexahydrotriazine, with mild heat, to form a polymer, with amine scavengers used to remove byproducts of the hexahydrotriazine ring opening.

It should also be noted that more than one triazine precursor may be used to make a polymer. A random copolymer may be made by using two different triazine precursors with one dithiol precursor. A block copolymer may be made by making a first segment using a first triazine precursor, making a second segment using a second triazine precursor, and then joining the first and second segments using the first triazine precursor, the second triazine precursor, or a mixture of the first and second triazine precursors. Further mixed polymers may be made by using mixtures of dithiol precursors and mixtures of triazine precursors.

A method of forming a material includes mixing an N-substituted hexahydrotriazine and a dithiol in a vessel to form a first mixture, adding an amine scavenger having a selective reactivity to amines to the first mixture, and heating the first mixture to form a thioaminal polymer. The substituent bonded to a nitrogen atom of the N-substituted hexahydrotriazine forms an amine byproduct during polymerization, which in turn reacts with an amine scavenger to become a species inert in the reaction mixture. At least some substituents bonded to a nitrogen atom of the N-substituted hexhydrotriazine may have molecular weight of about 120 Daltons or more. Suitable amine scavengers are as described above.

The method may further comprise adding a thiol-reactive material to the thioaminal polymer to form a second mixture, and the second mixture may be heated to form an end-modified thioaminal polymer, which may be a theranostic agent. A solvent may be added to the N-substituted hexahydrotriazine or the dithiol prior to forming the first mixture, may be added during forming the first mixture, may be added to the first mixture after forming the first mixture, or may be added to the second mixture after forming the second mixture.

The first mixture may be heated to a temperature generally above room temperature and up to about 200° C. In some cases, temperatures above 200° C. may be used, but some polymers degrade at temperatures above 200° C. In most cases, a reaction temperature of 50-100° C., for example about 80° C., will promote reaction to form the thioaminal polymer. The first mixture may be stirred, or otherwise mixed, while forming the thioaminal polymer.

A higher reaction temperature may be used in some cases to promote removal of byproducts during the reaction. The hexahydrotriazine precursor may be any of the hexahydrotriazine precursors described herein, and hydrogen atoms bonded to any or all nitrogen atoms in each hexahydrotriazine molecule may be substituted. One or more of the substituents bound to the nitrogen atoms of the hexahydrotriazine precursor will form a amine byproduct during the polymerization reaction, so an amine scavenger described above is added to remove the amine byproduct.

Formation of the polymer may be controlled to any desired degree by adjusting temperature of the reaction mixture, amine scavenger content, and by adjusting solvent content. Lowering temperature, removing amine scavenger, or adding solvent, will slow the growth of the molecular weight. Raising temperature, adding amine scavenger, or using less solvent, will promote growth of molecular weight, up to a point. If the reaction mixture is stirred or mixed, high viscosity may make mixing, and subsequent processing, difficult. Solvents such as N-methyl-2-pyrrollidone or other suitable aprotic solvents, which may include dimethylsulfoxide (DMSO), N,N-dimethylformamide (DMF), N,N-dimethylacetamide (DMA), Propylene carbonate (PC), and propylene glycol methyl ether acetate (PGMEA), of which any mixture may also be used.

The thiol-reactive material may include a species that is a reactive species, a non-reactive species, a cargo, a linking group, a drug, a functional species for further modification after construction of the end-modified thioaminal polymer, a polymerization starter, a chemical species capable of initiating depolymerization, or a combination thereof. Some species that may be attached to a polythioaminal through a thiol-reactive material include alkane thiols, aromatic thiols such as a thiophenol or a thioaniline, peptides, proteins, thio-acids, nucleotides, and combinations thereof. The thiol-reactive material may be a solid, liquid or gas, and the reaction between the thiol-reactive material may take place entirely in the liquid phase or at an interface between solid and liquid or liquid and gas.

The methods described herein may be used to form a polymer comprising a repeating unit with the following structure:

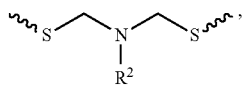

and at least a portion with the following structure:

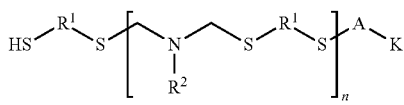

wherein $R^1$ is independently an organic or hetero-organic species, at least some instances of $R^2$ are substituents having molecular weight of about 120 Daltons or more, "A" is a linking group covalently bonded to a sulfur atom, and K is any radical suitable for bonding to "A". "A" may be a species selected from the group consisting of hexyl, dihydroxybutyl, and polyethylene glycol. The polymer may further comprise a portion with the following structure:

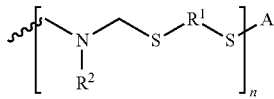

wherein "A" is a species selected from the group consisting of a cargo, a drug, a chemical species capable of initiating depolymerization, or a combination thereof, and $R^1$ and $R^2$ are as described above. "A" may be a species selected from the group consisting of an alkane thiol, an aromatic thiol, a peptide, a thio-acid, a nucleotide, and combinations thereof. "A" may be a therapeutic agent. In the structure above, the wavy lines denote a covalent chemical bond to a species or radical not shown in the structure.

The polymers described herein may grow to have number-average molecular weight $M_n$ of at least 10,000 Daltons by removing byproducts that hinder growth of molecular weight without heating to temperatures that favor degradation of polymer chains.

While the foregoing is directed to embodiments of the present invention, other and further embodiments of the invention may be devised without departing from the basic scope thereof, and the scope thereof is determined by the claims that follow.

What is claimed is:

1. A method of forming a composition, comprising:
   forming a reaction mixture comprising a hexahydrotriazine, a dithiol having the general structure HS—$R^1$—SH, and an amine scavenger having a selective reactivity to amines in the reaction mixture, the amine scavenger being one or more materials selected from the group consisting of an isocyanate, a thiocyanate, an organic carbonate, an organic thioanhydride, an organic anhydride, a carbonyl imidazole, an organic oxalate, an organic lactide, and an organic succinimide; and
   forming a thioaminal polymer by heating the reaction mixture to a temperature of at least about 50° C.;
   wherein $R^1$ is an organic or hetero-organic group.

2. The method of claim 1, wherein the hexahydrotriazine is a material comprising a plurality of molecules having the general structure

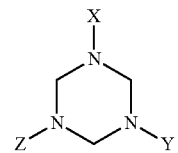

wherein X, Y, and Z are each chemical substituents covalently bonded to nitrogen atoms of the hexahydrotriazine, and at least one of X, Y, and Z, in each molecule of the plurality of molecules has a molecular weight of at least about 120 Daltons.

3. The method of claim 2, wherein X, Y, and Z are the same in each molecule of the plurality of molecules.

4. The method of claim 3, wherein the amine scavenger is selected from the group consisting of an isocyanate, a thiocyanate, an organic carbonate, and an organic anhydride.

5. The method of claim 4, wherein the amine scavenger is a cyclic carbonate.

6. The method of claim 3, wherein the amine scavenger is a mixture of molecules each of which reacts selectively with amines in the reaction mixture.

7. The method of claim 1, wherein the amine scavenger is supported on a substrate.

8. The method of claim 1, further comprising maintaining the temperature of the reaction mixture of at least about 50° C. while adding a subsequent amine scavenger to the reaction mixture.

9. The method of claim 1 wherein the dithiol is a linear alkane dithiol with a sulfide group attached to each of the initial and concluding carbonyl groups, and
   the amine scavenger is propylene carbonate.

10. The method of claim 2, wherein the amine scavenger sequesters amines in the reaction mixture.

11. The method of claim 1, wherein a thioaminal polymer is formed by heating the reaction mixture to a temperature of at least about 85° C.

12. The method of claim 7 wherein the amine scavenger is fluidized.

13. The method of claim 7 wherein the amine scavenger is solvated.

14. A method of forming a composition, comprising:
   forming a reaction mixture comprising a hexahydrotriazine, a dithiol having the general structure HS—$R^1$—SH, and an amine scavenger having a selective reactivity to amines in the reaction mixture, the amine scavenger being one or more materials selected from the group consisting of an isocyanate, a thiocyanate, an organic carbonate, an organic thioanhydride, an organic anhydride, a carbonyl imidazole, an organic oxalate, an organic lactide, and an organic succinimide; and
   forming a thioaminal polymer of the general form:

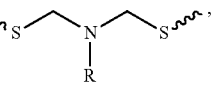

by heating the reaction mixture to a temperature of at least about 50° C.; wherein $R^1$ is an organic or hetero-organic group;

wherein a plurality of the R groups are organic or hetero-organic species and have a molecular weight greater than about 120 Daltons.

15. A method of forming a composition, comprising:

mixing an N-substituted hexahydrotriazine and a dithiol having the general structure HS—$R^1$—SH in a vessel to form a first mixture wherein $R^1$ is an organic or hetero-organic group;

adding an amine scavenger having a selective reactivity to amines to the first mixture, the amine scavenger being one or more materials selected from the group consisting of an isocyanate, a thiocyanate, an organic carbonate, an organic thioanhydride, an organic anhydride, a carbonyl imidazole, an organic oxalate, an organic lactide, and an organic succimide; and heating the first mixture to a temperature of at least about 50° C. to form a thioaminal polymer, wherein a substituent bonded to a nitrogen atom of the N-substituted hexahydrotriazine forms an amine byproduct, and the amine byproduct reacts with the amine scavenger to form an inert species, and at least some substituents bonded to a nitrogen atom of the N-substituted hexahydrotriazine have molecular weight of about 120 Daltons or more.

16. The method of claim 15 wherein a solvent is added to the N-substituted hexahydrotriazine prior to forming the first mixture.

17. The method of claim 15 wherein a solvent is added to the dithiol prior to forming the first mixture.

18. The method of claim 15 wherein a solvent is added during forming the first mixture.

19. The method of claim 15 wherein a solvent is added to the first mixture after forming the first mixture.

20. The method of claim 15 wherein a thiol-reactive material is added to the thioaminal polymer to form a second mixture, and the second mixture is heated to form an end-modified thioaminal polymer.

21. The method of claim 20 wherein the end-modified thioaminal polymer is a theranostic agent.

22. The method of claim 20 wherein a solvent is added to the second mixture after forming the second mixture.

23. The method of claim 2 wherein the amine scavenger is attached to a polymer.

* * * * *